US010475282B2

(12) United States Patent
Johnson

(10) Patent No.: US 10,475,282 B2
(45) Date of Patent: *Nov. 12, 2019

(54) METHOD AND SYSTEM FOR FUNDING MOBILE GAMING

(71) Applicant: Tipping Point Group, LLC, Las Vegas, NV (US)

(72) Inventor: Sam Johnson, Las Vegas, NV (US)

(73) Assignee: Tipping Point Group, LLC, Largo, FL (US)

( * ) Notice: Subject to any disclaimer, the term of this patent is extended or adjusted under 35 U.S.C. 154(b) by 69 days.

This patent is subject to a terminal disclaimer.

(21) Appl. No.: 15/187,201

(22) Filed: Jun. 20, 2016

(65) Prior Publication Data

US 2016/0328914 A1  Nov. 10, 2016

Related U.S. Application Data

(63) Continuation of application No. 13/269,762, filed on Oct. 10, 2011, now Pat. No. 9,373,107.

(51) Int. Cl.
*G07F 17/32* (2006.01)
*G06Q 20/18* (2012.01)
*G06Q 20/10* (2012.01)
*G06Q 20/28* (2012.01)
*G06Q 50/34* (2012.01)

(52) U.S. Cl.
CPC ......... *G07F 17/3244* (2013.01); *G06Q 20/10* (2013.01); *G06Q 20/18* (2013.01); *G06Q 20/28* (2013.01); *G06Q 50/34* (2013.01); *G07F 17/323* (2013.01); *G07F 17/3206* (2013.01); *G07F 17/3211* (2013.01); *G07F 17/3288* (2013.01)

(58) Field of Classification Search
CPC ..... G07F 17/3244; G06Q 20/10; G06Q 20/18
USPC .......................................... 463/20, 25, 26, 30
See application file for complete search history.

(56) References Cited

U.S. PATENT DOCUMENTS

| 4,467,424 A | 8/1984 | Hedges et al. |
| 5,851,149 A | 12/1998 | Xidos et al. |
| 5,902,983 A | 5/1999 | Crevelt et al. |
| 6,001,016 A | 12/1999 | Walker et al. |
| 6,012,983 A | 1/2000 | Walker et al. |
| 6,270,410 B1 | 8/2001 | DeMar et al. |
| 6,361,437 B1 | 3/2002 | Walker et al. |
| 6,508,709 B1 | 1/2003 | Karmarkar |
| 6,527,641 B1 | 3/2003 | Sinclair et al. |
| 6,575,834 B1 | 6/2003 | Lindo |
| 6,634,942 B2 | 10/2003 | Walker et al. |
| 6,846,238 B2 * | 1/2005 | Wells ...................... G07F 17/32 463/25 |

(Continued)

*Primary Examiner* — James S. McClellan
(74) *Attorney, Agent, or Firm* — Weide & Miller, Ltd.

(57) ABSTRACT

In a gaming method and system, a player is permitted to move funds from a gaming machine at a casino, such as funds won at the gaming machine or input into the gaming machine, with a funds account which the player can utilize to fund remote or mobile gaming. When a player of a gaming machine is identified, such as by detecting or sensing the player's mobile communication device or by a player's use of a player card or the like, a gaming machine may be configured or triggered to activate one or more funds association options, such as to offer the player the opportunity to associate funds provided to the gaming machine with their account for use in remote or mobile gaming.

19 Claims, 3 Drawing Sheets

(56) References Cited

U.S. PATENT DOCUMENTS

| | | |
|---|---|---|
| 6,969,317 B2 | 11/2005 | Walker et al. |
| 7,066,815 B2 | 6/2006 | Walker et al. |
| 7,470,196 B1 | 12/2008 | Joshi |
| 7,476,153 B2 | 1/2009 | Walker et al. |
| 7,524,244 B2 | 4/2009 | Walker et al. |
| 7,588,495 B2 | 9/2009 | Walker et al. |
| 7,607,981 B2 | 10/2009 | Walker et al. |
| 7,611,409 B2 | 11/2009 | Muir et al. |
| 7,690,043 B2 | 3/2010 | Saunders et al. |
| 7,699,703 B2 | 4/2010 | Muir et al. |
| 7,708,635 B2 | 5/2010 | Walker et al. |
| 7,727,062 B2 | 6/2010 | Herrmann et al. |
| 7,731,586 B2 | 6/2010 | Letovsky et al. |
| 7,753,792 B2 | 7/2010 | Walker et al. |
| 7,753,793 B2 | 7/2010 | Walker et al. |
| 7,806,763 B2 | 10/2010 | Walker et al. |
| 7,846,017 B2 | 12/2010 | Walker et al. |
| 7,877,798 B2 | 1/2011 | Saunders et al. |
| 7,975,927 B1 | 7/2011 | Whitney |
| 8,226,474 B2 | 7/2012 | Nguyen et al. |
| 8,397,305 B2 | 3/2013 | Saunders et al. |
| 8,571,991 B2 | 10/2013 | Saunders et al. |
| 9,373,107 B2 * | 6/2016 | Johnson ................. G06Q 20/18 |
| 2002/0002075 A1 * | 1/2002 | Rowe ..................... G06Q 20/10 463/25 |
| 2004/0067794 A1 | 4/2004 | Coetzee |
| 2004/0137987 A1 | 7/2004 | Nguyen et al. |
| 2005/0107156 A1 | 5/2005 | Potts et al. |
| 2007/0021198 A1 | 1/2007 | Muir et al. |
| 2008/0274792 A1 | 11/2008 | Walker et al. |
| 2008/0274802 A1 | 11/2008 | Joao |
| 2009/0078777 A1 | 3/2009 | Granucci et al. |
| 2009/0093311 A1 | 4/2009 | Saunders et al. |
| 2009/0131146 A1 | 5/2009 | Arezina et al. |
| 2010/0227670 A1 | 9/2010 | Arezina et al. |
| 2011/0263318 A1 * | 10/2011 | Agarwal ................ G06Q 20/32 463/25 |
| 2012/0165101 A1 | 6/2012 | Krishnamoorthy et al. |
| 2013/0090155 A1 | 4/2013 | Johnson |
| 2013/0196730 A1 | 8/2013 | Saunders et al. |
| 2013/0260878 A1 | 10/2013 | Saunders et al. |
| 2013/0267326 A1 | 10/2013 | Froy, Jr. et al. |

* cited by examiner

METHOD AND SYSTEM FOR FUNDING MOBILE GAMING

RELATED APPLICATION DATA

This application is a continuation of U.S. application Ser. No. 13/269,762, filed Oct. 10, 2011, now U.S. Pat. No. 9,373,107.

FIELD OF THE INVENTION

The present invention relates to wager-based gaming and methods of funding such gaming.

BACKGROUND OF THE INVENTION

Casino gaming has been in existence for many years. In casino gaming, a player is physically present at the casino and plays the game in person. This allows the player to place wagers directly. For example, a player may exchange money for chips and then wager those chips at a gaming table such as a poker table, craps table or the like. A player may also place wagers to play gaming machines. For example, a gaming machine may be configured to accept coins via a coin acceptor, paper currency via a bill acceptor, or printed value tickets or the like.

In recent years, mobile and remote gaming have both been developed. Mobile and remote gaming both permit a player to participate in a game at locations remote from a casino or other locations where the game or other wagering event occurs. In some jurisdictions, a player may be permitted to provide wagering funds from their remote location, such as by using a credit card or debit card. However, in other jurisdictions, transmitting funds over a telecommunication link in furtherance of wagering is not permitted. In those jurisdictions, a player is generally required to travel to the casino and deposit funds for later use in funding wagering games which the player plays remotely.

For example, a player may be required to travel to a casino, locate a casino cashier and provide funds and identification information to the casino cashier. The casino retains the player's funds for use by the player at a later time. This type of arrangement is well known, such as detailed in U.S. Pat. No. 7,470,196.

Of course, this arrangement has a number of drawbacks, the most significant of which is that the player must travel to a casino cashier to deposit funds. Aside from the travel, the player may be required to stand in a cashier line with other players who are making similar deposits, akin to waiting for a free teller at a bank. Generally, a casino only provides one or a small number of cashiers. Thus, if just a few players wish to deposit funds, each player may have to wait in a line to do so. Another drawback is that there is no direct feedback between the act of the player depositing funds and the player's mobile or remote gaming. The funds are merely deposited into the player's account and then the player must later access their account to determine the existence of the funds.

It also shall be noted that even in those jurisdictions where it is legal for remote gaming to be funded by a credit card or the like, the mere fact that such player may have to utilize multiple accounts for different purposes, such as one account when playing physically at a casino and another account when playing remotely, is also inconvenient and undesirable.

SUMMARY OF THE INVENTION

One aspect of the invention comprises methods of funding gaming activities. Other aspects of the invention comprise gaming machines and gaming systems configured to implement the methods.

In a preferred embodiment of the invention, a player is permitted to move funds from a gaming machine at a casino to a funds account belonging to the player. The funds which are transferred to the funds account may comprise funds which are input or provided to the gaming machine by the player or winnings awarded by the gaming machine. The player may utilize the funds which are associated with the account to fund various wagering events, including wagering at an electronic gaming machine or, more preferably, remote or mobile gaming.

In a preferred embodiment of the invention, when a player of a gaming machine is identified, such as by detecting or sensing the player's mobile communication device or by a player's use of a player card or the like, a gaming machine may be configured or triggered to activate one or more funds association options, such as to offer the player the opportunity to associate funds provided to the gaming machine with their account for use in remote or mobile gaming.

Further objects, features, and advantages of the present invention over the prior art will become apparent from the detailed description of the drawings which follows, when considered with the attached figures.

DETAILED DESCRIPTION OF THE INVENTION

In the following description, numerous specific details are set forth in order to provide a more thorough description of the present invention. It will be apparent, however, to one skilled in the art, that the present invention may be practiced without these specific details. In other instances, well-known features have not been described in detail so as not to obscure the invention.

One embodiment of the invention is a method and system for funding mobile or remote gaming. By the term "remote", it is meant that a player is able to participate in a gaming event which is at least in part enabled or occurs at a location different than the location of the player. For example, remote gaming includes, but is not limited to, a player participating in a game which is offered at a casino, but at a location away from the casino but offered by the same casino. Such a location might comprise the player's home or office or a hotel room, accessed via mobile devices and/or the internet. By the term "mobile" it is meant that a player participates in a gaming event via a device which is moving or easily moved. For example, mobile gaming includes, but is not limited to, a player participating in a game via a cellular telephone or PDA, either played locally on that device or connected remotely through that device to the internet playing the game.

In general, in accordance with the system and method of the invention, a player is permitted to provide funds to a gaming machine at a casino, which funds may be associated with an account which the player can utilize to fund remote or mobile gaming. In a preferred embodiment, when a player of a gaming machine is identified, such as by detecting or sensing the player's mobile communication device or by a player's use of a player card or the like, a gaming machine may be configured or triggered to activate one or more funds association options, such as to offer the player the opportunity to associate funds provided to the gaming machine with their account for use in remote or mobile gaming.

Figure 1:
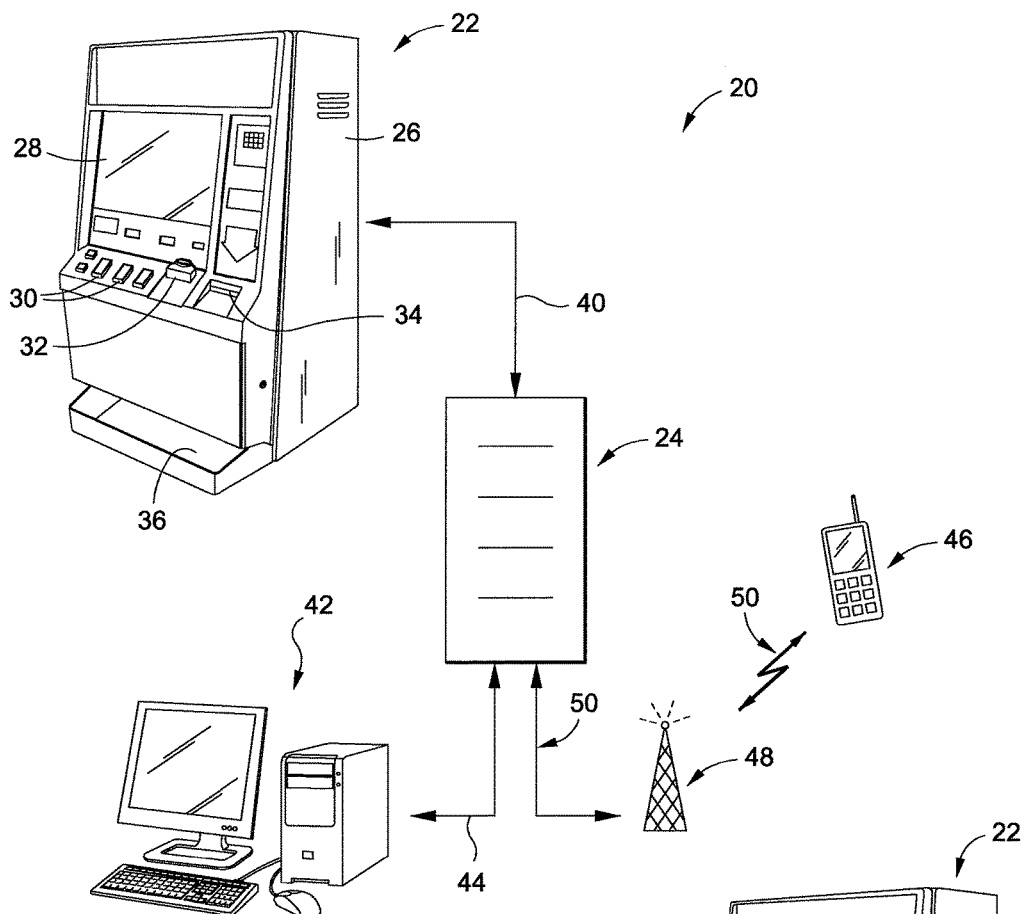
FIG. 1 illustrates a gaming system in accordance with the invention.

The invention will now be described in more detail first with reference to FIG. 1. As illustrated in FIG. 1, one embodiment of a system 20 of the invention comprises at least one gaming machine 22 and one or more servers 24. Preferably, the gaming machine 22 is configured to offer one or more wagering games to one or more players thereof. The gaming machine 22 may be located at a casino or similar location where gaming is offered.

Figure 2:
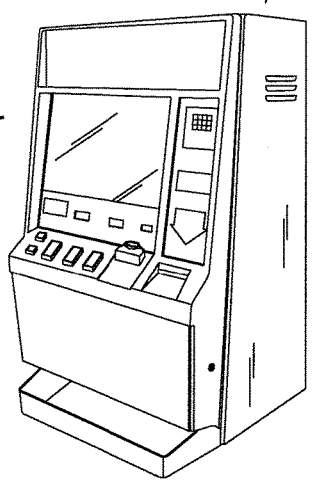
FIG. 2 illustrates a gaming machine in accordance with the invention, the gaming machine configured to communicate with a player's mobile communication device.

The gaming machine 22 may have various configurations. One configuration of a gaming machine is illustrated in FIGS. 1 and 2. As illustrated, the gaming machine 22 generally comprises a housing or cabinet 26 for supporting and/or enclosing various components required for operation of the gaming machine. In the embodiment illustrated, the housing 26 includes a door located at a front thereof, the door capable of being moved between an open position which allows access to the interior, and a closed position in which access to the interior is generally prevented. The configuration of the gaming machine 22 may vary. In the embodiment illustrated, the gaming machine 22 has an "upright" configuration. However, the gaming machine 22 could have other configurations, shapes or dimensions (such as being of a "slant"-type or other configuration as is well known to those of skill in the art).

The gaming machine 22 preferably includes at least one display device 28 configured to display game information. The display device 28 may be a mechanical, electro-mechanical or electronic display, such as one or more rotating reels, a video display or the like. When the display device 28 is an electronic video display, it may comprise a cathode ray tube (CRT), high resolution flat panel liquid crystal display (LCD), projection LCD, plasma display, field emission display, digital micro-mirror display (DMD), digital light processing display (DLP), LCD touchscreen, a light emitting display (LED) or other suitable displays now known or later developed, in a variety of resolutions, sizes and formats (e.g. 4:3, widescreen or the like). The display 28 may be capable of projecting or displaying a wide variety of information, including images, symbols and other indicia or information associated with game play, game promotion or other events.

As described in more detail below, the gaming machine 22 is preferably configured to present one or more games upon a player making a monetary payment or wager. In this regard, as described in more detail below, the gaming machine 22 includes means for accepting monetary value.

In one embodiment, certain game outcomes may be designated as winning outcomes. Prizes or awards may be provided for winning outcomes, such as monetary payments (or representations thereof, such as prize of credits), or promotional awards as detailed herein. As detailed below, the gaming machine 22 includes means for returning unused monetary funds and/or dispensing winnings to a player.

The gaming machine 22 may be configured to present a wide variety of games. Such games may comprise bingo or bingo-based games, pull-tab games, lotto or instant lottery style games, slot games, poker or other card games or a variety of other games.

The gaming machine 22 preferably includes one or more player input devices 30 (such as input buttons, plunger mechanisms, a touch-screen display, joystick, touch-pad or the like). These one or more devices 30 may be utilized by the player to facilitate game play, such as by providing input or instruction to the gaming machine 22. For example, such input devices 30 may be utilized by a player to place a wager, cause the gaming machine 22 to initiate a game (such as spin slot reels or display cards in a video poker game), to indicate cards to be held or discarded in a game of video draw poker, to "cash out" of the gaming machine, or to provide various other inputs.

In one preferred embodiment, the gaming machine 22 includes at least one microprocessor or controller for controlling the gaming machine, including receiving player input and sending output signals for controlling the various components of the machine 22 (such as generating game information for display by the display 28). The controller may be arranged to receive information regarding funds provided by a player to the gaming machine, receive input such as a purchase/bet signal when a purchase/bet button is depressed, and receive other inputs from a player. The controller may be arranged to generate information regarding a game, such as generating game information for display by the at least one display 28 (such as information representing images of displayed cards, slot reel symbols or the like), for determining winning or losing game outcomes and for displaying information regarding awards for winning game outcomes, among other things.

The controller may be configured to execute machine readable code or "software" or otherwise process information, such as obtained from a remote server. Software or other instructions may be stored on a memory or data storage device. The memory may also store other information, such as pay table information. The gaming machine 22 may also include one or more random number generators for generating random numbers, such as for use in selecting bingo numbers, cards, slot reel symbols or the like, for presenting the game in a random fashion.

The gaming machine 22 may be configured to generate and present games in a stand-alone manner or it may be in communication with one or more external devices at one or more times. For example, the gaming machine 22 may be configured as a server based device and obtain game code or game outcome information from a remote game server (in which event the gaming machine controller may receive game information from the server, such as game outcome information, and use that server-generated information to present the game at the gaming machine). In one embodiment, the gaming machines 22 may be game kiosks or interfaces and two or more of the gaming machines 22 are configured to permit different players to play the same game being offered via a common game server (such as the same bingo game).

As indicated, the gaming machine 22 is configured to present one or more wagering games. Thus, the gaming machines 22 is preferably configured to accept value, such as in the form of coins, tokens, paper currency or other elements or devices representing value such as monetary funds. For example, as illustrated in FIG. 1, the gaming machine 22 might include a coin acceptor 32 for accepting coins. Of course, associated coin reading/verifying devices and coin storage devices may be associated with the gaming machine 22 if it is configured to accept coins. Likewise, the gaming machine 22 might include a media reader 34. Such a reader may be configured to accept and read/verify paper currency and/or other media such as tickets. Of course, in such event the gaming machine 22 may further be configured with one or more paper currency or ticket storage devices, such as cash boxes, and other paper currency or media handling devices (including transport devices).

The gaming machine 22 might also be configured to read FOBs, magnetic stripe cards or other media having data associated therewith and via which value or funds may be associated with the gaming machine 22.

In one embodiment, the gaming machine 22 is configured to award winnings for one or more winning wagering game outcomes. Such winnings may be represented as credits, points or the like. In one embodiment, the player may "cash out" and thus remove previously associated funds and any awarded winnings or such may otherwise be paid to the player. For example, upon an award or at cash-out, associated funds may be paid to the player by the gaming machine 22 dispensing coins to a coin tray 36. In another embodiment, funds may be issued by dispensing paper currency. In yet another embodiment, a player may be issued a media, such as a printed ticket, which ticket represents the value which was paid or cashed out of the machine. The aspects of gaming machine "ticketing" systems are well known. One such system is described in U.S. Pat. No. 6,048,269 to Burns, which is incorporated herein in its entirety by reference.

It will be appreciated that the gaming machine illustrated in FIGS. 1 and 2 is only exemplary of one embodiment of a gaming machine. For example, it is possible to for the gaming machine to have various other configurations, including different shapes and styles and having different components than as just described.

Referring to FIG. 1, in one embodiment, the one or more servers 24 comprises at least one computing device. The one or more servers 24 may have, for example, at least one controller which is configured to execute various instructions (comprising executable software or embedded as hardware). In one embodiment, the one or more servers 24 include or are coupled to a data storage device. Such might comprise one or more forms of semi-conductor type storage devices such as ROM or RAM (such as EEPROM, PROM, etc. as are now known or later developed), and or mass storage devices such as hard drives, tape drives or the like.

As described below, at one or more times the one or more gaming machines 22 are each in communication with the one or more servers 24. Thus, each gaming machine 22 and the server 24 preferably include at least one communication interface. Such an interface may comprise a combination of hardware and software. Each gaming machine 22 may communicate with the one or more servers 24 (and vice versa) via one or more communication links 40. Such links may be temporary or permanent, may be wired or wireless or a combination thereof, and may include one more paths or components. For example, the links 40 might include portions of one or more LANs or WANs, including private or public networks. For security reasons, in a preferred embodiment the link 40 is a private communication link, such as an internal casino LAN. In order to secure exchanged information, the data may be protected, such as by encrypting it during its transmission over the communication link 40.

In general, in accordance with the present invention, a user may provide funds to a gaming machine 20, which funds may be used to place wagers to play one or more games at the gaming machine or be associated with a player account for use in placing wagers to play one or more games remotely. Referring to FIG. 1, the one or more servers 24 may store (in a memory thereof or a memory/data storage device accessible by the server) information regarding one or more player accounts. Such information may be stored in various files or in a wide variety of other data formats. For example, a player's account may be identified by an account number. Associated with that account number may be a variety of player information, such as player identification information. Such player identification information may comprise one or more of the player's name, address, telephone number, email address, cell phone number, age, and/or other information. The player information may also include funds information, such as funds balance information.

In one embodiment, each player preferably is assigned their own account. The player's account, and thus the funds associated therewith, may be accessible through use of certain access control information. Such might comprise, for example, a user I.D. and password.

In one embodiment, the system 20 of the invention permits a player to participate in remote or mobile gaming. As illustrated in FIG. 1, a player may link to the casino (or other entity offering gaming) via the one or more servers 24. For example, the one or more servers 24 may comprise or include one or more game servers. Such servers 24 may be configured, for example, as web-type servers which a user may access via the World Wide Web.

As illustrated, a player might access the one or more servers 24 from various remote or mobile devices. For example, a player might access the one or more servers 24 from a work or home computer 42. Such a computer 42 might comprise a desktop computer, laptop computer, notebook or other type of computing device. Generally, such a device includes at least one player input device, at least one visual display device, and at least one communication interface. The player might access the one or more servers 24 via various communication links 44. Again, such links may be temporary or permanent, may be wired or wireless or a combination thereof, and may include one more paths or components. The links 40 might include portions of one or more LANs or WANs, including private or public networks, including the World Wide Web.

Similarly, a player might access the one or more servers 24 via one or more mobile communication devices 46. Such devices 46 might comprise, for example, a tablet, mobile phone or PDA. The player may access the one or more servers 24 via one or more communication links 50. Again, such links may be temporary or permanent, may be wired or wireless or a combination thereof, and may include one more paths or components. The links 50 might include portions of one or more LANs or WANs, including private or public networks, including the World Wide Web. In one embodiment, the link(s) 50 preferably comprise one or more wireless links, such as to a cellular telephone network.

When a player has accessed the one or more servers 24 via their remote or mobile device, the player may be presented the opportunity to play or participate in one or more wagering games. In order to participate, a player is preferably required to place a wager. In one embodiment, such a wager may be placed from funds associated with the player's account.

In order to utilize those funds, the player may be required to provide their account identification or access information. For example, a player may input their user ID and password into the computer 42 or mobile PDA 46. This information is preferably transmitted to the one or more servers 24 which utilize the information to access the player's account (of course, if the information is incorrect, the player's request is preferably denied). Once the player has accessed their account, they may utilize funds associated with the account to place one or more wagers.

The one or more servers 24 may be configured to offer a variety of wagering events in a variety of manners. For example, the one or more servers 24 might be configured to permit a player to place a wager upon a sporting event or play various games such as poker, slots, keno, bingo or other games now known or later developed.

The wagering event information may be presented in various fashions. For example, relative to sports wagering, a player may be presented with a menu of sporting events and odds and may be permitted to select a particular wagering event. Relative to a game of video poker, game information such as the images of cards may be displayed to the player. Such game information may be generated at the server 24 and then transmitted for display at the player's computer 42 or mobile communication device 46. In other embodiments, the one or more servers 24 might be configured to transmit game code to the player's computer 42 or mobile communication device 46, which code is executed or run upon the player's device in order to present the game information. Of course, a wide variety of configurations may be utilized to present wagering game information to a player at their remote or mobile device, as is well known in the art.

Most importantly, in accordance with the present invention, a player may associate monetary funds with their account (which funds may be used, as described herein, to place wagers for remote or mobile gaming or physically at the casino on an gaming machine) via one or more gaming machines 22. For example, a player may provide coin to the coin acceptor 32 or paper currency or other value media (such as a value ticket), such as via the media reader 34. Some or all of the provided value may be associated with the player's account, as described in more detail below.

Figure 4:
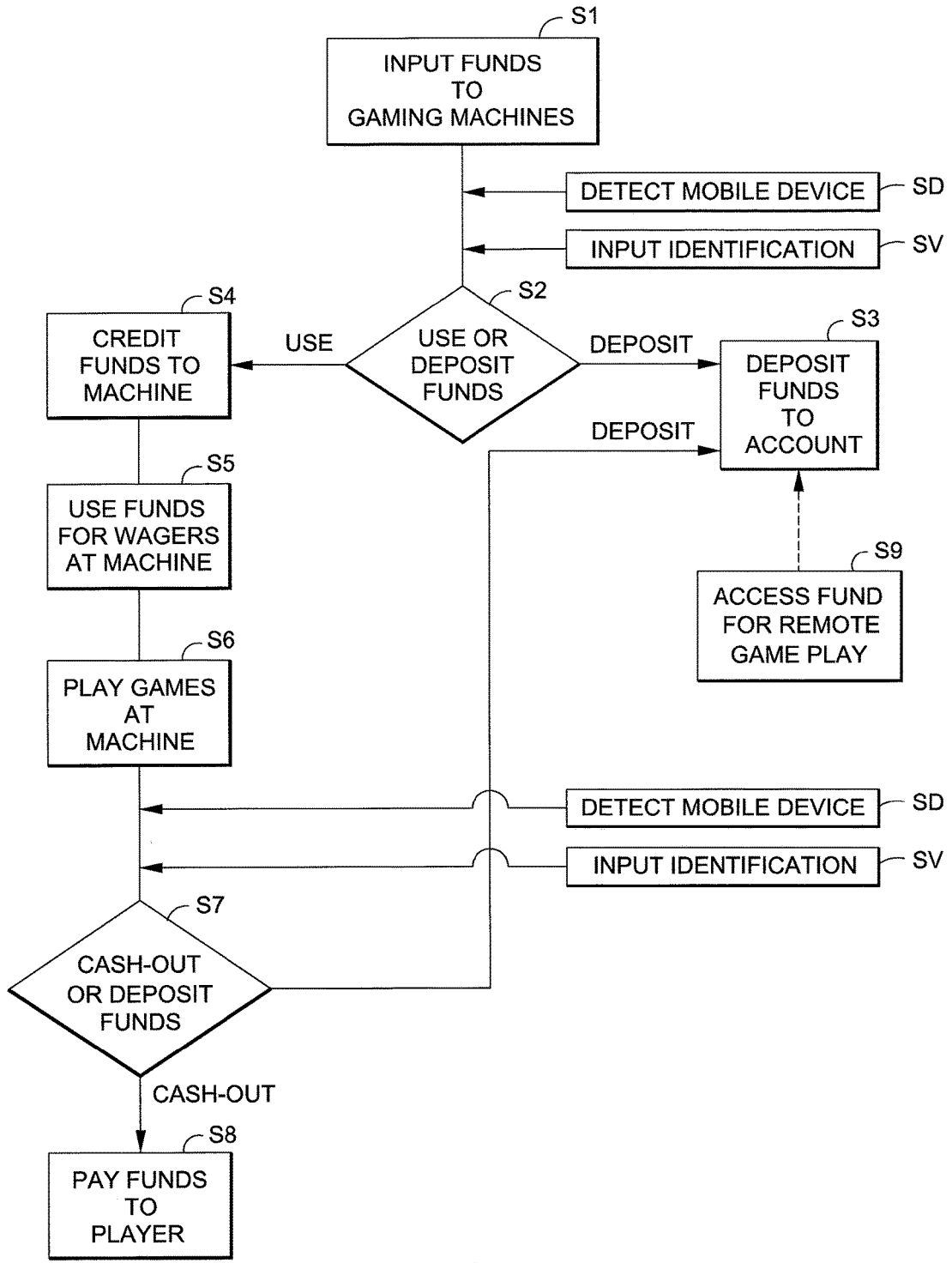
FIG. 4 is a flowchart illustrating a method in accordance with the invention.

One embodiment of a method of the invention will be described with reference to FIG. 4. In a step S1, a player may provide funds to a gaming machine 22. This step may comprise a player traveling to a casino and then locating a gaming machine 22. In one embodiment, the gaming machine 22 may be one of many gaming machines located at the casino, and preferably any of those machines. For example, such a gaming machine 22 might be configured to offer one or more video poker games, one or more slot games, one or more bingo, keno or other games. The gaming machine 22 may have various styles, be configured to offer games under various names, titles or themes.

As indicated, the player may provide funds to the gaming machine 22 in various manners. Such might comprise a player providing a value ticket, coins and/or paper currency to the gaming machine.

In one embodiment, in a step S2, the player may be provided the election of associating the provided funds with either the gaming machine or the player's account, which such funds may have already been placed on account through a remote device. For example, a player may elect, as in a step S3, to deposit the provided funds into their account. In such event, the funds, or a portion of the funds which are designated by the player, are preferably credited to the player's account.

On the other hand, a player may elect, as in a step S4, to deposit the funds to the gaming machine 22 for use at the gaming machine. In such event, the gaming machine 22 may display the value of the funds which the player provided to the gaming machine, such as in a number of credits.

As to funds which are associated with the gaming machine 22, the player may utilize those funds to place one or more wagers to play one or more wagering games at the gaming machine 22, as in a step S5. Once a player utilizes such funds to place a wager (such as by pressing a "bet one" or "bet max" or other wager-accepting input from the player at the gaming machine as is well known), the gaming machine 22 may present one or more wagering games to the player, a in a step S6. Such wagering games may have winning or losing outcomes. In the case of winning outcomes, funds (such as credits) may be awarded, thus increasing the value of funds associated with the gaming machine. In the case of losing outcomes, the player may lose their wager, thus decreasing the value of funds associated with the gaming machine 22.

After playing one or more games at the gaming machine 22, the player may elect to leave the gaming machine 22. If the player has funds remaining at the gaming machine 22, the player may be provided the option of either having those funds returned to them or associating them with their player account, as in a step S7. For example, upon completion of game play, a player may provide a "cash out" input. If the gaming machine 22 determines that the player still has funds remaining, the gaming machine 22 may offer the player the choice of having the funds returned or deposited to the player's account.

If the player elects to have the funds returned, then the gaming machine 22 may return or dispense the funds, as in step S8. For example, the gaming machine 22 might dispense coins, currency and/or a value ticket or other media to the player representative of the value of the funds.

If the player elects to have the funds transferred, then the gaming machine 22 may cause the remaining funds to be transferred to the player's account, as in step S3.

As indicated herein, if the player has funds associated with their account, then they may utilize those funds to place wagers for remote or mobile gaming, as in step S9.

Of course, the above-described method may be implemented in various manners and in a number of variations. In one embodiment, if a player elects to transfer funds to their player account, they may be required to provide their account access information. For example, upon a player indicating that they wish to transfer their funds, the gaming machine 22 may be configured to request the player's user ID and password, as in step SV. Upon verifying the player's account, the funds may then be transferred.

In one embodiment, a player may be permitted to transfer and/or use some but not all of the provided funds. For example, a player might provide $100 in funds to a gaming machine. The player might elect to associate the entire $100 with the gaming machine 22 for play, transfer the entire $100 to their player account, or split the funds so that some are transferred and some are associated with the gaming machine. For example, the player might elect to transfer $50 in funds to their account and associate the other $50 for play at the gaming machine 22. Likewise, at cash-out, a player might elect to have all of their funds returned, have all of the funds transferred, or split the funds to that some are returned and some are transferred.

In one embodiment, a player may be permitted to associate or save funds preference settings with the system, such as with their player account. The funds settings may permit the player to cause certain funds activities or events to occur automatically. For example, a player might be permitted to indicate a percentage of gaming machine winnings that the player desires to be automatically transferred to the player's account. A player might also pre-designate how funds provided to a gaming machine should be allocated, such as between gaming machine play and their account for remote wagering. For example, relative to the above example, if the player had pre-designated that 50% of all funds input to a gaming machine were to be allocated to the gaming machine and the remaining 50% to their account, the $50/$50 split described above could be performed automatically by the gaming machine as soon as the player is identified and the player provided the funds to the gaming machine. Of course, the player might be permitted to designate a wide variety of such settings or actions, may be permitted to modify them (such as via input to the gaming machine, via a remote device or the like), and may be permitted to override them.

In accordance with another aspect of the invention, a gaming machine 22 may be configured to implement various functionality when a player is identified. In one embodiment, a player might be identified by detecting the player's mobile communication device, by a player's use of a player tracking or club card or other means of identification such as use of biometrics such as a fingerprint, retinal scan or comparison of the player's image to a stored image. Of course, such identification is preferably used to identify the player's funds account, and thus the account to which funds may be transmitted or from which funds may be accessed. For example, as illustrated in FIG. 2, a gaming machine 22 may be configured to detect a player's mobile communication device 46. The gaming machine 22, or the gaming system 20, may be configured to detect the presence of a player's mobile communication device 46 in various manners. In one embodiment, as illustrated in FIG. 2, the gaming machine 22 might include a wireless receiver or transmitter/receiver. Such a receiver may be configured to detect wireless signals from a mobile communication device which is in the vicinity thereof. Alternatively, the gaming machine 22 might be configured with one or more physical device connectors, such as cradles or ports, with which the player may associate their mobile communication device.

Of course, the gaming system 20 may otherwise be configured to detect a player's mobile communication device. For example, the gaming system 20 might include one or more detectors apart from the gaming machines 22. Such detectors might be located, for example, throughout a casino.

Referring again to FIG. 4, one embodiment of a method may include the step SD of detecting a player's mobile communication device. For example, upon a player providing funds to a gaming machine 22, the gaming machine 22 (or system 20) is preferably configured to check for the presence of the player's mobile communication device 46. If the player's device 46 is detected, such as by a wireless receiver, physical connection or the like, the gaming machine 22 may be configured to implement various of the functionality described above. For example, after the player's mobile communication device 46 has been detected, the gaming machine 22 may display a request that the user provide their account access information, such as via a graphical interface displayed on the display 28 of the gaming machine 22. Alternatively, the gaming machine 22 may be configured to immediately display an interface to the player which requests that the player indicate whether the player wishes to associate the provided funds with the gaming machine or the player's account. If the player wishes to associate funds with their account, then the gaming machine 22 may request that the player provide their account access information.

Likewise, such steps may be performed when a player wishes to leave the gaming machine. For example, at the time a player elects to cash-out, the gaming machine 22 (or system 20) may be configured to detect a player's mobile communication device 46 (if such has not already occurred). If the device 46 is detected, then the gaming machine 22 may be configured to either request the player's account access information (if such has not already been provided), or to display an interface to the player which requests that the player indicate whether the player wishes to have the funds paid to them or transferred to their account.

In one embodiment, the funds functionality may only be implemented if it is determined that the identified player and/or their device has a corresponding funds account. For example, a player without a funds account for remote wagering may approach a gaming machine 22 with their mobile communication device. The gaming machine 22 may detect the device, compare information regarding the device to the stored account information, and determine that the device does not identify any particular player or account. In such event the funds functionality described may not be automatically initiated unless the player otherwise identifies themselves.

Figure 3:
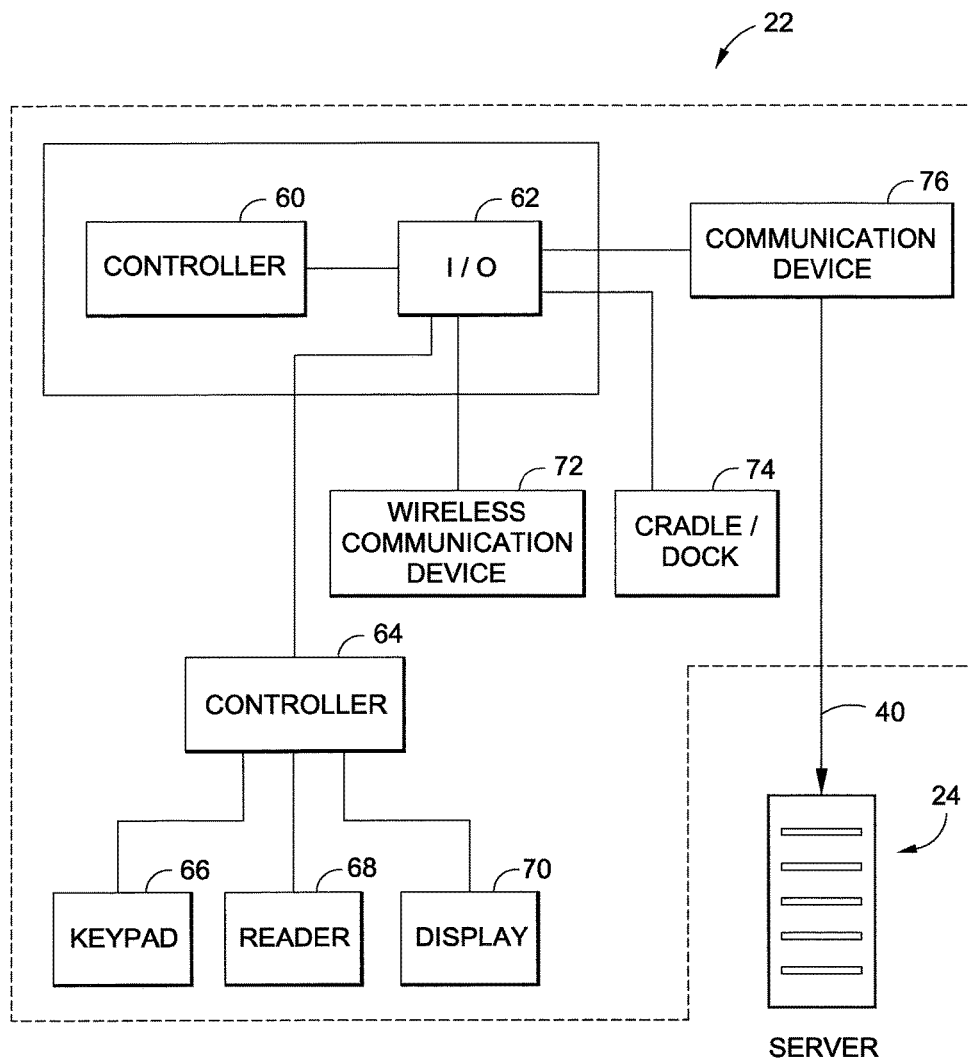
FIG. 3 schematically illustrates a configuration of a gaming machine in accordance with the invention.

As indicated, embodiments of the invention may be implemented in various manners. FIG. 3 illustrates one particular embodiment of a gaming machine 22 in accordance with the invention. As illustrated, the gaming machine 22 has a main controller 60. The main controller 60 may be, for example, a processor configured to execute machine readable instructions or "software", or might be configured as hardware. Software may be stored at one or more associated data storage devices such as a memory device. An input/output device 62 is associated with the controller 60, whereby the controller 60 may transmit instructions or signals to other devices or locations and receive instructions or signals from other devices or locations. The input/output device 62 may comprise, for example, a bus.

In one embodiment, the gaming machine 22 may be configured with a player tracking device. Such a device may comprise a controller 64 which controls a keypad 66, a media reader 68 and a video display 70. Such devices are well known. The player tracking device may be configured, for example, to read information from a player's player club or player tracking card (such as from a magnetic stripe, RFID tag, NFC or the like). The keypad may be configured to receive input from the player, and the display may be configured to display information to a player. As illustrated, the player tracking device may be in communication with the gaming machine controller 60 via the input/output device 62. Additional details of the use of the player tracking device are described below.

In one embodiment, the gaming machine 22 may include a wireless communication device or interface 72, such as a wireless receiver. Such a receiver may, as indicated above, be configured to at least detect the presence of a mobile communication device. The gaming machine 22 may alternately, or in addition, be configured with one or more physical ports for connection of one or more mobile communication devices. Such ports might comprise, for example, a cradle or dock 74. The cradle or dock 74 may include one or more connectors for mating with the port or connector of a mobile communication device 46.

In order to permit the gaming machine 22 to communicate with other devices, the gaming machine 22 preferably includes at least one communication interface 76. The communication interface 76 preferably permits the communication link 40 to be established with the at least one server 24.

In one embodiment of the invention, the player's account access information may be provided by the player tracking device. For example, a player may elect to create a player account with a casino. The casino may utilize the player's account to identify the player, track the player's gaming play, award the player with promotional and other types of awards, and track funds provided by the player for remote/mobile gaming.

In one embodiment, a player might be issued a media such as a magnetic stripe player card. This card may have the player's account information encoded on it. When the player needs to access their account, the player might input their card into the media reader 68. In one embodiment, once the player's account identifier is determined, the player may be required to enter a password, personal identification number (PIN) or the like in order to access their account. For example, after the player's card has been read, the controller 64 of the player tracking device may cause the player tracking display 70 to request the player's PIN. The player may then enter their PIN into the keypad 66. If the PIN is correct, the player's account may be accessed.

Of course, the player might provide account access information in other manners. For example, a player might enter their account access information via a graphical user interface and touch screen of the display 28. In another embodiment, the player might utilize a keypad to directly enter the information (rather than by using a player card).

As indicated herein, in one embodiment a player might identify themselves at a gaming machine 22 using their player tracking card or similar device. Once the player is identified and is determined to have a funds account, the gaming machine 22 may be configured to automatically present the funds functionality described herein.

In one embodiment, information may be transmitted to the player's mobile communication device 46 and/or be received from that device. As indicated above, in one embodiment the gaming machine 20 and/or system 22 may be configured to merely detect the presence of a mobile communication device 46 in the vicinity of the gaming machine 22. In such event, the various functionality described above may be implemented, even though it is not known if the detected device actually belongs to the player (for example, a player of the gaming machine 22 might enter funds but then the gaming machine 22 might detect the mobile device of another casino patron who is merely walking by the gaming machine).

In another embodiment, the identity of the player and/or their mobile communication device may be confirmed. For example, once a gaming machine 22 detects a mobile communication device 46, the gaming machine may request that the player identify themselves by inputting their player account access information. Once that information has been input, the gaming machine 22 and system 20 know the identity of the player. At that point, the gaming machine 22 (or system 20) may transmit information to the player's mobile communication device 22, such as by text message, email or a phone call (such as using the player's cell phone number and/or email address associated with the player's account). For example, the gaming system 20 might transmit a message to the player "Welcome John Smith, if you wish to receive mobile gaming play information, please reply text 'yes'." If the player responds, the gaming system 22 may send additional information to the player's mobile communication device.

Of course, the link between the player and their mobile communication device 46 at a gaming machine 22 may be more easily confirmed if the player associates their mobile device 46 with a cradle or dock of the gaming machine 22. In that instance, the gaming machine 22 may communicate directly with the mobile communication device 46, such as to obtain identity information which it can use to match against the player's account.

In this regard, the player may provide account access information via their mobile communication device 46. For example, a player might approach a gaming machine 22 and dock their device 46 into a cradle. The gaming machine 22 may then request that the player input their player account access information via their mobile communication device 46. The input information may be transmitted from the device 46 to the gaming machine 22 and then on to the one or more servers 24 for confirmation. Once the player's account is identified, the player's identity is then known to the gaming system 20.

In one embodiment, the gaming machine 22 and/or system 20 may transmit information to the player's mobile communication device 46. For example, once a player has deposited funds at the gaming machine 22 and the player's mobile communication device 46 is identified, the gaming machine 22 and/or system 20 may transmit information to the player's mobile communication device 46.

In one embodiment, for example, the gaming device 22 and/or system 20 may transmit information to the player's mobile communication device 46 regarding the amount of funds the player has associated with the player's account. For example, after a player has elected to transfer $100 to their player account, a message may be transmitted to the player's mobile gaming device confirming the transfer of the funds. Such information might also include the player's total funds balance. For example, a message to the player's device 46 might detail "Confirmed $100 transfer; total account balance $450.50."

It will be appreciated that the principles of the invention may be implemented via any number of systems and devices. For example, as indicated above, a casino's gaming system 20 may have one or more servers 24. For example, the casino might operate a main gaming system having one or more servers which monitor the play of the gaming machines 22, a player tracking system having one or more servers which interfaces with the player tracking device of each gaming machine for use in identifying players, tracking game play and awarding promotional awards, an accounting system which tracks funds information associated with the gaming machines 22, such as the amount of funds deposited by players, wagered by players, lost by players, winnings awarded to players and may generate value ticket information and validate presented tickets, one or more bonusing systems having one or more servers for implementing one or more bonuses, such as one or more progressive bonuses, jackpots or the like, and a remote gaming system having one or more servers configured to generate game information for the remote play of one or more wagering games by players, among other systems. Of course, these various systems may be configured to work together to implement the functionality described herein.

The invention has numerous advantages. First, advantageously casino gaming machines can be used as "cashiers" who permit a player to deposit funds to an account which may be used to fund remote or mobile gaming. A player may be permitted to deposit funds with any casino gaming machine. In the case of large casinos, this may enable a player to deposit funds with any of thousands of gaming machines in various locations throughout the casino.

This represents a significant advantage over existing configurations where a player must travel to a specific cashier or cage and deposit funds to the cashier. First, in that situation the player may only be permitted to deposit funds at a single location. Second, in such an arrangement the player may have to wait for an attendant to physically receive and deposit the funds. In accordance with the invention, because a player can deposit funds at any number of gaming machines, the player can simply locate an unused gaming machine to avoid waiting in line for an attendant to deposit funds. Second, the deposit process is fully automated and can occur at a gaming machine without the intervention of an attendant or cashier.

In some instances, multiple casinos may have their gaming machines linked to a single player account or multiple player accounts may be linked. In this arrangement, a player may deposit funds at gaming machines at any of two or more locations, such as casino A or casino B, and have the funds associated with the user's account.

In accordance with another aspect of the invention, a player may transfer funds from their funds account to a gaming machine for use in a casino. In one embodiment, the player may be permitted to associate funds with their account from a remote location. For example, a player might use a home computer and a credit card to associate funds with their account. In another embodiment, a player might utilize their mobile communication device to transfer funds to the gaming machine 22, such as by electronic transfer to the machine (in similar manner to the Google Wallet service). The player might then later travel to gaming machine at a casino. The player can access the funds in their funds account from the gaming machine, including transferring funds from the account to the gaming machine for play/use at the gaming machine.

Yet another advantage of the invention is the linking of the player's mobile communication to the funds deposit at the gaming machine. In accordance with the invention, when a player deposits funds at a gaming machine and transfers the funds to their account for use in remote or mobile gaming, information regarding that transaction may be presented to the player via their mobile communication device. This allows the player to link the transaction at the gaming machine to their remote or mobile gaming account. This information is also useful to a player because the player may later utilize their mobile communication device to engage in mobile gaming. In that event, the player can easily view their account balance and related information because it was likely recently updated or provided directly to their mobile communication device (such as via a text message which can easily be viewed, versus the player having to take steps to access their account to gain information regarding an updated balance).

Yet another aspect of the invention is the provision of a single player funds account which a player can use for in-casino game play, remote game play and/or mobile game play. Not only is the single funds account convenient for the player, but it is convenient for a casino. In particular, a casino can track all player funds activity, including deposits, transfers, wins, losses, and the like, associated with all types of gaming activity (in casino and remote/mobile) via a single system and set of accounts (rather than having to set up and track/poll multiple systems each having different accounts for different purposes).

It will be understood that the above described arrangements of apparatus and the method there from are merely illustrative of applications of the principles of this invention and many other embodiments and modifications may be made without departing from the spirit and scope of the invention as defined in the claims.

What is claimed is:

1. A method of utilizing an electronic gaming machine as a funding device for mobile game play comprising the steps of:
    accepting one or more items having associated monetary funds value from a player via an acceptor device at said gaming machine;
    validating said one or more items having associated monetary funds value;
    detecting whether a player's mobile communications device is associated with a mobile device interface at said gaming machine, comprising at least one of detecting if said player's mobile communications device is physically connected to a physical communications device interface of said electronic gaming machine and detecting if said player's mobile communications device is communicatively coupled to a wireless transceiver of said electronic gaming machine;
    a) when a player's mobile communications device is not detected, generating a monetary funds balance at said gaming machine for use in funding one or more wagers upon one or more wagering games presented at said gaming machine based upon said validated one or more items having associated monetary funds value; and
    b) when a player's mobile communications device is detected, presenting said player at least an option to generate a monetary funds balance at said gaming machine based upon said validated one or more items having associated monetary funds value and an option to transfer funds to a remote player account for funding mobile gaming, the mobile gaming being gaming where an outcome is not determined at the gaming machine;
    receiving an election from said player of a selected one of said options;
    when said player selects said option to generate a monetary funds balance at said gaming machine, establishing a monetary funds balance at said gaming machine for use in funding one or more wagers upon one or more wagering games presented at said gaming machine based upon said validated one or more items having associated monetary funds value; and
    when said player selects said option to transfer funds, transferring at least part of said monetary funds value to said remote player account.

2. The method in accordance with claim 1 further comprising, when said player selects said option to transfer funds, the steps of receiving player identification information and using said identification information to identify said player's account.

3. The method in accordance with claim 2 wherein said step of receiving player identification information comprises receiving information input by said player to said gaming machine.

4. The method in accordance with claim 1 further comprising, when said player selects said option to transfer funds, the step of identifying said player's player account from information obtained from said player's mobile communications device.

5. The method in accordance with claim 1 further comprising the steps of:

receiving a request from said player to transfer funds from said player account to said player's mobile communications device;

transmitting information from said gaming machine to said mobile communications device via a communication link between said gaming machine and said player's mobile communications device regarding said transferred funds;

generating a monetary funds balance associated with said mobile communications device; and receiving a request from said player to utilize all of part of said funds balance associated with said mobile communications device to fund a wager placed at said mobile communications device for game play, the mobile communications device being operable to present said game play independent from the stationary electronic gaming machine.

6. The method in accordance with claim 1 wherein said one or more items having associated monetary funds value comprise one or more items of currency, said acceptor device comprises a bill acceptor and said step of validating comprises validating said one or more items of currency.

7. The method in accordance with claim 1 wherein said one or more items having associated monetary funds value comprise one or more coins, said acceptor device comprises a coin acceptor and said step of validating comprises validating said one or more coins.

8. The method in accordance with claim 1 wherein said one or more items having associated monetary funds value comprise one or more monetary value tickets, said acceptor device comprises a ticket reader and said step of validating comprises validating said one or more monetary value tickets.

9. The method in accordance with claim 1 wherein said physical communications device interface comprises at least one of a cradle and a dock having at least one connector which is configured to connect to a second connector of said player's mobile communications device.

10. The method in accordance with claim 1 wherein said wireless transceiver is in communication with a controller of said electronic gaming machine.

11. The method in accordance with claim 1 wherein a remote server is operable to present said game play independent of any game play on the stationary electronic gaming machine.

12. A gaming system comprising:
at least one stationary electronic gaming machine configured to present at least one wagering game and comprising at least one device configured to accept monetary funds, at least one video display and at least one mobile device interface comprising at least one of a physical communications device interface and a wireless communications transceiver;

an accounting server configured to store information regarding a plurality of player funds accounts, each account having an associated funds balance;

a communication link between said at least one stationary electronic gaming machine and said accounting server;

said at least one stationary electronic gaming machine configured to accept monetary funds from a player, to detect whether a player's mobile communications device is associated with the mobile device interface at said gaming machine, comprising at least one of detecting if said player's mobile communications device is physically connected to said physical communications device interface of said electronic gaming machine and detecting if said player's mobile communications device is communicatively coupled to said wireless transceiver of said electronic gaming machine, and to:

a) when a player's mobile communications device is not detected, generate a monetary funds balance at said gaming machine for use in funding one or more wagers upon one or more wagering games presented at said gaming machine based upon said validated one or more items having associated monetary funds value; and b) when a player's mobile communications device is detected, present said player at least an option to generate a monetary funds balance at said gaming machine based upon said validated one or more items having associated monetary funds value and an option to transfer funds to a remote player account for funding mobile gaming, the mobile gaming being gaming where an outcome is not determined at the gaming machine;

receive an election from said player of a selected one of said options;

when said player selects said option to generate a monetary funds balance at said gaming machine, establish a monetary funds balance at said gaming machine for use in funding one or more wagers upon one or more wagering games presented at said gaming machine based upon said validated one or more items having associated monetary funds value; and when said player selects said option to transfer funds, transferring at least part of said monetary funds value to said remote player account, said accounting server configured to increase said funds balance of said player's account based upon said funds transferred from said gaming machine.

13. The gaming system in accordance with claim 12 further comprising:
a communication link between said accounting server and said player's mobile communications device; and
said accounting server configured to decrease a funds balance of said player's account based upon one or more wagers placed by said player at said player's mobile communications device for game play at said mobile communications device, rather than said stationary electronic gaming machine, the mobile communications device being independently operable from the gaming machine.

14. The gaming system in accordance with claim 12 further comprising at least one game server configured to transmit wagering game information to said player's mobile communications device in response to said wager.

15. The gaming system in accordance with claim 12 wherein said electronic gaming machine further comprises means for identifying said player.

16. The gaming system in accordance with claim 12 wherein said means comprises a card reader configured to read a player identification card.

17. The gaming system in accordance with claim 12 wherein said physical communications device interface comprises at least one of a cradle and a dock having at least one connector which is configured to connect to a second connector of said player's mobile communications device.

18. The gaming system in accordance with claim 12 wherein said wireless transceiver is in communication with a controller of said electronic gaming machine.

19. The gaming system in accordance with claim 12 wherein a remote server is operable to present said game play independent of any game play on the stationary electronic gaming machine.

* * * * *